3,410,881
PROCESS FOR SYNTHESIZING SPECIFIC COMPLETE MIXED POLYOL ESTERS
James B. Martin, Hamilton, and Robert A. Volpenhein, Green Township, Hamilton County, Ohio, assignors to The Procter & Gamble Company, Cincinnati, Ohio, a corporation of Ohio
Continuation-in-part of application Ser. No. 405,408, Oct. 21, 1964. This application Feb. 18, 1965, Ser. No. 438,820
11 Claims. (Cl. 260—404.8)

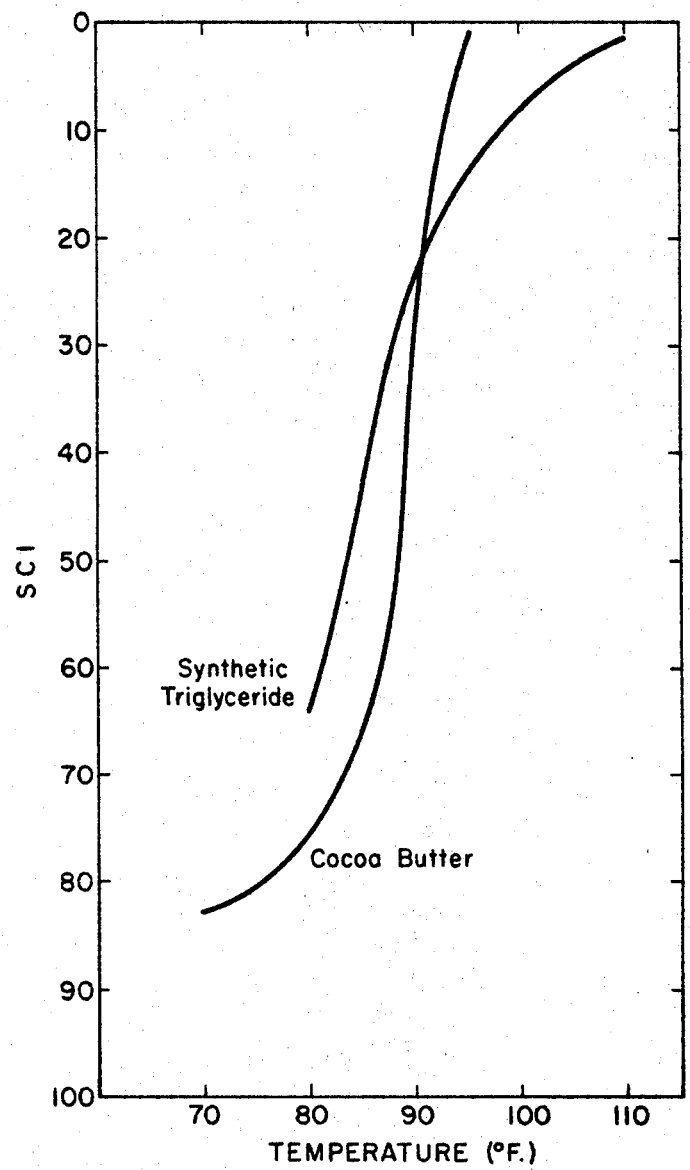

ABSTRACT OF THE DISCLOSURE

Reacting a partial polyol monocarboxylic acid ester with a molar excess of acidic lipid anhydride in the presence of a perchloric acid catalyst to produce specific complete mixed polyol ester with substantially no ester group rearrangement occurring during reaction. Reacting a molar excess of oleic anhydride with 1,3-diglyceride in the presence of a perchloric acid catalyst to produce synthetic cocoa butter.

---

This application is a continuation-in-part of the application of James B. Martin and Robert A. Volpenhein, Ser. No. 405,408, filed Oct. 21, 1964, and now abandoned.

This invention relates to a process for synthesizing complete mixed polyol esters, that is, polyol esters having at least two different ester groups and no hydroxyl groups. More particularly, this invention relates to a process for esterifying partial polyol esters without rearrangement of ester groups either by intermolecular or intramolecular exchange. The term "partial polyol ester" is used herein to denote a polyol which is partially, that is, incompletely, esterified and as a consequence contains at least one hydroxyl group.

In general, this process provides mixed polyol esters with specific ester groups at specific polyol hydroxyl sites. Thus, this process is especially useful in providing synthetic cocoa butter and closely related oleaginous substitutes from inexpensive raw materials such as lard and palm oil.

Cocoa butter is unusual among naturally occurring fats in that it is normally a brittle solid up to 77° F., has a relatively narrow melting range and is almost completely liquid at 95° F. or slightly below body temperature. These unique melting characteristics make cocoa butter suitable for use in confectionery products, especially chocolates. Such melting characteristics contribute glossy coatings, absence of stickiness and favorable volume changes during confectionery product molding.

Because of these advantageous melting characteristics and because of demand for the properties which cocoa butter imparts to confectionery products, large quantities of this expensive commodity are imported even when domestic fats which can be used to produce synthetic cocoa butter are in plentiful supply at much less than the cost of cocoa butter. For many years, therefore, attempts have been made to provide from readily available and cheaper fats a product that can be used to replace at least part of the cocoa butter in chocolates and other confectionery products that normally contain cocoa butter.

In this search for synthetic cocoa butter, it has been determined that its advantageous physical characteristics are derived from the arrangement of the fatty acid radicals in its glycerides. Analytical tests have shown that cocoa butter comprises principally 1-palmitoyl-2-oleoyl-3-stearoyl glycerol.

With most esterification procedures, the synthesis of such substantially pure specific triglycerides is impossible since substantial ester group rearrangement occurs during esterification of specific partial glycerides, namely, mono- and diglycerides, the synthesis of which is known in the prior art. Thus, acylation of 1,3-diglyceride with oleic acid and a conventional esterification catalyst provides only a minor proportion of triglycerides having an oleoyl group at the 2-position, where necessarily this group must occur in cocoa butter preparation.

Feuge, Willich and Guice, The Journal of the American Oil Chemists Society, July 1963, pp. 260–264, demonstrate that ester group rearrangement ordinarily occurs during the esterification of partial glycerides, and, at page 260, point out that hydrochloric, sulfuric and sulfonic acids widely used esterification catalysts, cause ester group rearrangement. Similarly, ester group rearrangement ordinarily occurs during esterification of partial polyol esters other than glycerides, e.g., during esterification of partial 1,2-propylene glycol esters.

One known method for synthesizing a cocoa butter substitute comprises reacting a diglyceride having palmitoyl and stearoyl groups at the 1- and 3-positions, with oleoyl chloride. This method is described in Dutton and Scholfield U.S. Patent 3,012,890, granted Dec. 12, 1961. Furthermore, it is known in the prior art that, in general, acid chlorides can be used to specifically esterify mono- and diglycerides. The use of acid chlorides for specific esterification has many undesirable aspects, however. For instance, acid chlorides are very corrosive and their use involves handling problems. Besides, hydrochloric acid, a by-product of the reaction of an acid chloride with a hydroxyl group, is disposed of with difficulty.

It is therefore an object of this invention to provide a novel process for synthesizing specific complete mixed polyol esters, especially specific mixed triglycerides.

It is a further object of this invention to provide a process for synthesizing specific complete mixed polyol esters with substantially no rearrangement of ester groups either by intermolecular or intramolecular exchange.

It is a further object of this invention to provide a process for synthesizing specific complete mixed polyol esters without using corrosive acid chlorides.

Another object of this invention is to provide a process for synthesizing specific complete mixed polyol esters not resulting in a hydrochloric acid by-product.

Yet another object of this invention is to provide a process for the preparation of synthetic cocoa butter.

These and other objects will be apparent after referring to the following specification and drawing, the details of which are hereinafter more fully described.

FIGURE 1 is a plot of SCI vs. temperature in degrees F. for both cocoa buter made synthetically by the process of this invention and a commercially-available cocoa butter, as more fully described in Example I.

According to this invention, is has been found that complete mixed polyol esters with specific ester groups at specific polyol hydroxyl sites can be prepared by esterifying certain partial polyol esters with a molar excess (as defined hereinafter) of certain acidic lipid anhydrides in the presence of a perchloric acid catalyst.

The partial polyol esters to be esterified within the scope of this invention are derived from polyols selected from the group consisting of (1) aliphatic diols where the hydroxyl groups are unsymmetrically substituted with respect to the carbon chain or (2) aliphatic polyols containing at least three hydroxyl groups. These diols and polyols are partially esterified with monocarboxylic acids containing from 8 to 22 carbon atoms to provide partial polyol esters for use herein.

Partial polyol esters derived from aliphatic diols include, for example, esters derived from 1,2-propylene glycol, 1,2-butanediol and 1,3-butanediol. Partial polyol esters derived from aliphatic polyols containing at least three hydroxyl groups include, for example, esters derived from glycerin, 1,2,4 - butanetriol, erythritol, adonitol, arabitol, xylitol, 1,2,6-hexanetriol, sorbitol and mannitol. The ester groups of these partial polycol esters include, for example, those derived from caprylic, capric, lauric, myristic, palmitic, stearic, oleic, linoleic, linolenic, arachidic and behenic acids.

Partial polyol esters which are preferred for use herein are partial glyceride esters including 1- and 2-monoglycerides and 1,2- and 1,3-diglycerides. The monoglyceride ester groups can be saturated or unsaturated. The diglycerides include disaturated, monoacid diglycerides, e.g., distearin; disaturated, diacid diglycerides, e.g., 1-palmitoyl-3-stearoyl glycerol; diunsaturated, monoacid diglycerides, e.g., diolein; diunsaturated diacid diglycerides, e.g., 1-oleoyl-3-palmitoleoyl glycerol; and monounsaturated, monosaturated, diacid diglycerides, e.g., 1-palmitoyl-3-palmitoleoyl glycerol. The terms "diacid" and "monoacid" are used herein to denote glycerides having two different acyl substituents and one kind of acyl substituent respectively.

The acidic lipid anhydrides for use in esterifying the above partial polyol esters have the following structural formula:

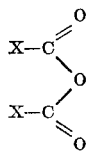

wherein X is a radical selected from the group consisting of:
(1) alkyl groups containing from 7 to 21 carbon atoms and having the formula

R—

(2) residues of alkyl half-esters of a dicarboxylic acid having the formula

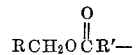
$RCH_2O\overset{O}{\overset{\|}{C}}R'—$ (3) residues of monoacyl diol half-esters of a dicarboxylic acid having the formula $R\overset{O}{\overset{\|}{C}}OH\overset{Z}{\overset{|}{C}}R''\overset{Z}{\overset{|}{C}}HO\overset{O}{\overset{\|}{C}}R'—$ (4) residues of diacyl glyceride half-esters of a dicarboxylic acid having the formula $R\overset{O}{\overset{\|}{C}}OCH_2(R\overset{O}{\overset{\|}{C}}O)CHCH_2O\overset{O}{\overset{\|}{C}}R'—$ and
(5) residues of monoacyl derivatives of a primary monohydroxy monocarboxylic acid having the formula

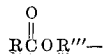
$R\overset{O}{\overset{\|}{C}}OR'''—$ wherein in (1)-(5) above:

R is an alkyl group having 7 to 21 carbon atoms;
R' is an alkylene group having 2 to 4 carbon atoms;
R" is an alkylene group having 0 to 4 carbon atoms;
Z is a radical selected from the group of hydrogen and methyl; and
R''' is an alkylene group having 2 to 5 carbon atoms.

The term "alkyl" is used herein to include both saturated and unsaturated carbon chains.

As previously explained, the above partial polyol esters are reacted with a molar excess of the above acidic anhydrides in the presence of a perchloric acid catalyst. This molar excess is defined as more than at least one mole of acidic lipid anhydride for each mole of available partial ester hydroxyl groups. The molar excess of acidic lipid anhydride is an essential feature herein and is necessary for reaction without ester group rearrangement. Preferably, at least a 10% molar excess is used and optimally at least a 20% to 50% molar excess. The maximum amount of excess acidic lipid anhydride is not critical. For example, a molar excess of ten to twenty times can be used, especially if the excess anhydride is used as the reaction solvent as described hereinafter.

The perchloric acid catalyst is another essential feature herein and is necessary for reaction without ester group rearrangement. The catalyst is used as a water solution containing at least about 20% by weight and not more than about 70% by weight perchloric acid. If the water solution contains less than about 20% by weight perchloric acid the catalyst will not promote the esterification reaction; this is true no matter how much less-than-about-20% perchloric acid solution is added to an initial partial ester, anhydride mixture. The not-more-than-about 70% by weight limitation is critical for two reasons: (1) because a perchloric acid-water solution forms a maximum boiling point mixture containing 71.6% acid; and (2) because more concentrated solutions are dangerously explosive if allowed to come in contact with oxidizable materials. To promote the esterification reaction, the perchloric acid to anhydride molar ratio must exceed about 0.01 to 1. A maximum limit of 0.50 to 1 for this molar ratio is desirable because of the explosive nature of perchloric acid.

The above perchloric acid catalyzed esterification reaction takes place over a wide range of temperatures and in the presence of a wide variety of solvents without ester group rearrangement.

Generally, reaction temperatures range from —110° F. to 230° F., with 32° F. to 120° F. preferred because of the explosive nature of perchloric acid, especially above 120° F. The reaction can in most cases be carried out at room temperature. It is noted that substantial reaction normally occurs at room temperature in a time period ranging from five minutes to five hours. Thus, the reaction of this invention is very rapid when compared with esterification with acid chlorides which at room temperature normally takes from 10 to 24 hours for substantial reaction completeness.

In general, the solvent, if any, can be any organic liquid medium which will form a phase sufficiently uniform so as to bring the reactants into contact. Preferably if it is a liquid, a molar excess of acidic lipid anhydride is used as the solvent, this excess being calculated on the basis of only one acidic lipid radical of each anhydride molecule reacting. Other useful solvents include chlorinated hydrocarbons such as chloroform and carbon tetrachloride, aromatic hydrocarbons such as benzene and aliphatic esters such as ethyl acetate. Still other useful solvents include aromatic heterocyclic bases such as pyridine, tertiary amides such as dimethylformamide and dimethylacetamide, and heterocyclic oxides such as tetrahydrofuran.

In the case where monoglycerides are the partial polyol esters, the specific solvent used seems to have some effect on whether substantially no ester group rearrangement occurs; benzene and pyridine are desirably used as solvents in this case.

Ordinarily, in the reaction of this invention only one acid radical of each anhydride molecule reacting provides an ester group for the complete mixed polyol ester reaction product; the other acid radical of the anhydride molecule combines with a hydrogen atom to form the corresponding acid. The following equation represents a typical example of such a reaction:

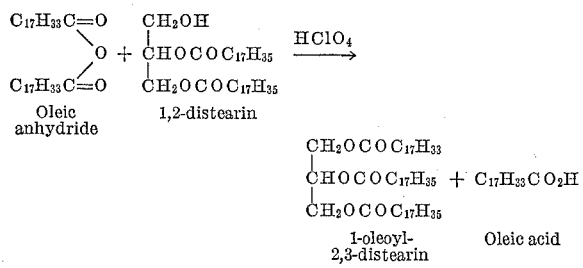

Turning now to one specific application of the above described general process, that is, a process for preparing synthetic cocoa butter, it has been found that certain diglycerides can be esterified with oleic acid anhydride by the above described general method to provide synthetic cocoa butter. These diglycerides can be obtained by directed superglycerination of lard or of substantially completely hydrogenated palm oil in the presence of triacetin using the method of Baur and Lange, Journal of the American Chemical Society, 1951, vol. 73, page 3926.

Turning now to a general discussion of the reactants for use in the present process, most of such reactants cannot be obtained commercially at present. As far as the partial polyol esters are concerned, the preparation of specific mono- and diglycerides is described in Mattson and Volpenhein, Journal of Lipid Research, July 1962, vol. 3, No. 3, pages 281–296, and in the above Baur and Lange article.

Specific partial carboxylic acid esters of 1,2-propylene glycol can also be prepared for use in the present process. Most 1-mono-fatty acid esters of 1,2-propylene glycol, such as 1-propylene glycol mono-stearate, can be prepared by reacting 1,2-propylene glycol with a desired fatty acid, such as stearic acid, in the presence of a catalyst, such as p-toluene sulfonic acid, and in a solvent, such as xylene; and the 1-fatty acid ester separated by fractional crystallization, for instance. And 2-mono-fatty acid esters of 1,2-propylene glycol, such as for example 2-propylene glycol monobehenate, can be prepared by acylation of an appropriately blocked 1,2-propylene glycol derivative, such as 1-tetrahydropyranyl propylene glycol, with an acid chloride, such as behenoyl chloride, and cleavage of the blocking group in the presence of boric acid.

The anhydrides for use in the present process can be prepared by admixing the corresponding acidic lipid with an excess of acetic or propionic anhydride, cooling the reaction product, crystallizing the acid lipid anhydride and collecting the desired product by filtration.

The most effective processes for the formation of acidic lipid anhydrides useful in this invention employ metathesis with acetic anhydride either at low temperatures, i.e., 32° F. to 140° F., with perchloric acid catalysis, or at higher temperatures, i.e., 140° F. to 300° F., without perchloric acid catalysis, but with volatilization of the acetic acid formed in the reaction.

It is noted that no particular problems are encountered in preparing unsaturated anhydrides; on the other hand, unsaturated acid chlorides are made with difficulty since chloride ion used in acid chloride preparation tends to react at the unsaturated position. This ease of preparation of unsaturated acid anhydrides as compared to preparation of unsaturated acid chlorides demonstrates another advantage for this invention over the acid chloride method of specific esterification.

Acidic lipids for use in preparing the acidic lipid anhydrides by the above methods can be derived from a variety of sources, depending on the specific acidic lipid involved. The acidic lipids for use herein include aliphatic monocarboxylic acids, alkyl half-esters of a dicarboxylic acid, monoacyl diol half-esters of a dicarboxylic acid, diacyl glyceride half-esters of a dicarboxylic acid, and monoacyl derivatives of a primary monohyroxy monocarboxylic acid.

The monocarboxylic acids contain from 8 to 22 carbon atoms and include, for example, stearic and oleic acids. They can be readily obtained from glycerides by saponification, acidulation and isolation procedures or by hydrolysis. The acid desired determines the choice of glyceridic material. For example, a technical grade of stearic acid can be obtained from hydrogenated soybean oil and a technical grade of oleic acid can be obtained from olive oil.

The alkyl half-esters of a dicarboxylic acid are condensation products of dicarboxylic acids having from 4 to 6 carbon atoms with straight chain fatty alcohols containing 8 to 22 carbon atoms. Useful dicarboxylic acids include succinic, glutaric and adipic acids. Useful alcohols include, for example, cetyl and octadecyl alcohols. The dicarboxylic acids are adavntageously condensed with the fatty alcohols in a mutual solvent such as dimethylformamide, dimethylacetamide, dioxane, xylene or toluene either with or without the use of a catalyst such as sulfuric acid, p-toluene sulfonic acid, hydrogen chloride, zinc chloride, and other such catalysts. These preparations are best carried out with reaction temperatures in the range of from 175° F. to about 350° F. with water being removed under reduced pressure. The desired condensation products are isolated by appropriate distillation, and/or washing, and/or crystallization treatments if such treatments are required to remove solvents, excess reactants and impurities.

The monoacyl diol half-esters of a dicarboxylic acid are the reaction products of monoacyl diols and dicarboxylic acid anhydrides. The diols for use in preparing these lipids contain from 2 to 6 carbon atoms and can contain either primary or secondary hydroxy groups. Useful diols include, for example, ethylene glycol, 1,2-propylene glycol, 1,3-propanediol, 1,4-butanediol, 1,3-butanediol and 1,5-pentanediol. An excess of one of these diols is condensed with a straight chain monocarboxylic acid, containing 8 to 22 carbon atoms, such as stearic or oleic acid, in the presence of an esterification catalyst, such as sulfuric acid, and preferably with refluxing with xylene. This condensation reaction yields a monoacyl diol which in turn is reacted at a temperature ranging from 175° F. to 350° F. with the anhydride of a dicarboxylic acid containing 4 to 6 carbon atoms such as succinic, glutaric and adipic acids, to form the desired lipid.

The diacyl glyceride half-esters of a dicarboxylic acid are reatcion products of diacyl glycerides and dicarboxylic acid anhydrides. The diacyl glycerides for use in preparing these lipids contain acyl groups derived from straight chain monocarboxylic acids containing from 8 to 22 carbon atoms, such as stearic and oleic acids, and can be prepared as described in the previously referred to Mattson and Volpenhein article. These diacyl glycerides are reacted at a temeprature ranging from 175° F. to 350° F. with the anhydride of a dicarboxylic acid containing from 4 to 6 carbon atoms, such as succinic, glutaric and adipic acids, to form the desired lipids.

The monacyl derivatives of a primary monohydroxy-monocarboxylic acid are reaction products of monocarboxylic acid chlorides containing from 8 to 22 carbon atoms, such as stearic and oleic acid chlorides, with primary monohydroxy-monocarboxylic acids having from 3 to 6 carbon atoms. Suitable monohydroxy-monocarboxylic acids include hydracrylic, 4-hydroxybutyric, 5 - hydroxypentanoic, and 6 - hydroxyhexanoic acids. The desired lipids can be prepared from these acid chlorides and monohydroxy-monocarboxylic acids as described in Tucker U.S. Patent 2,251,695, granted Aug. 5, 1941.

The methods set forth above for the preparation of various reactants which are useful herein are given only by way of example and do not constitute any part of the present invention.

The following examples are illustrative of the present invention and are not to be construed in any way as limiting the scope of the invention. A molar excess (as previously defined) of anhydride over partial polyol ester is used in each of these examples. This molar excess is necessary to obtain substantially no ester group rearrangement during esterification. Unless otherwise specified, all percentages in the following examples are by weight.

EXAMPLE I

Synthetic cocoa butter preparation

Three hundred and four grams of palm oil hydrogenated to an iodine value of 8 and having an acid value of 0 is reacted with 157 grams of water-washed and distilled triacetin in the presence of 26 ml. of sodium methoxide catalyst in the form of a xylene suspension (0.09 gm. sodium methoxide per ml. xylene). The reaction is carried out at 195° F. with stirring and for 1.5 hours. At this point 58 grams of dry glycerol is added, with heat and stirring continued for one more hour. The reaction mixture is then allowed to cool with stirring and is stored at room temperature for two days.

Undesirable components are then removed from the reaction mixture by the following purification procedure: The solid mass resulting after the two-day storage is slurried with 30 ml. of aqueous acetic acid solution containing 50% water by volume. The slurry is dissolved in 4 liters of ethanol-hexane solution (50% ethanol by volume) and the resulting solution cooled to 50° F. This temperature is maintained for a four-hour period, during which crystals are formed. At the end of the four-hour period, the crystals are separated by vacuum filtration and recrystallized overnight from 3 liters of ethanol-hexane solution (50% ethanol by volume). The crystals recovered by filtration are dissolved in one liter of ethyl ether and water-washed three times. The ether is removed by evaporation and the residue crystallized from 2.5 liters of ethanol-hexane solution (50% ethanol by volume) at 50° F. After filtration the crystals are air dried to provide 170 grams of substantially pure product.

Analysis of the above product shows it to be substantially pure 1,3-diglyceride containing palmitoyl and stearoyl radicals. More particularly, the above product has a hydroxyl value of 91.4 as compared to a theoretical value of 94.2 for 100% diglyceride and contains 0.3% monoglycerides. It has a complete melting point of 159° to 160° F. Analysis for specific acid radicals shows the presence of 0.1% myristic, 34.9% palmitic and 64.7% stearic, all by weight with each acid radical expressed as the corresponding acid.

Oleic anhydride is prepared by refluxing 100 grams of oleic acid in 300 grams of acetic anhydride for three hours. The bulk of the distillable material present, mostly acetic acid, is then removed at atmospheric pressure. The residue is then heated at 355° F. under 1 to 2 mm. Hg pressure for 30 minutes to drive off remaining volatile impurity.

Twenty-five grams of the previously formed 1,3-diglyceride and 35 grams of the previously formed oleic anhydride are reacted in 65 ml. water-washed, distilled and dried chloroform in the presence of 1.2 ml. 70% perchloric acid catalyst (0.22 mole perchloric acid to 1 mole anhydride). The reactants are stirred together at room temperature for three hours.

In order to purify the desired product, the resulting reaction mixture is dissolved in 200 ml. of ethyl ether together with 25 ml. water. The ether phase is waterwashed three times, dried with sodium sulfate, filtered and the solvent removed by evaporation in an inert atmosphere. The residue is crystallized twice from 300 to 400 ml. of acetone at 20° F. and the crystals dried under vacuum to provide 31 grams of substantially pure product.

The product has an acid value of 1.8 and a hydroxyl value of 2.0. These analytical data show that substantially all the product is triglyceride.

Analysis for specific acid radicals present in the synthetic triglyceride so formed shows 22.8% palmitic, 44.0% stearic and 33.0% oleic, all by weight with each expressed as the corresponding acid. In comparison, a commercially-available cocoa butter described in this example contains 25% palmitic, 34% stearic, 36% oleic and 3% linoleic, all by weight with each acid radical expressed as the corresponding acid. Thus, the above synthetic triglyceride and cocoa butter contain substantially similar weight proportions of each of the same fatty acids.

Analysis for 2-position fatty acids by the method of Mattson and Volpenhein, Journal of Lipid Research, January 1961, vol. 2, No. 1, pp. 58–64, namely, by hydrolysis of the triglyceride with pancreatic enzyme and analysis of the resulting monoglyceride fatty acids, shows that the above synthetic triglyceride contains 91% by weight of oleic acid esterified at the 2-position as compared to 86% by weight of oleic acid at the 2-position in the commercially-available cocoa butter. The percentages of oleic acid are by weight of all acids at the 2-position, the acyl group attached thereto being expressed as the corresponding acid.

Further similarity between the above synthetic triglyceride and the commercially-available cocoa butter is shown by a comparison of consistencies as shown in FIGURE 1. Samples of synthetic triglyceride and of commercially-available cocoa butter are melted; chilled in ice for five minutes; held for one day at 70° F.; held for one week at 80° F.; and held overnight at 50° F.; and the solids content at these various temperatures determined at the end of the temporary period by the dilatometric method as edscribed in Fulton, Lutton and Willie, Journal of the American Oil Chemists Society, Mar. 1954, vol. XXXI, No. 3, pp. 98–103. Comparison of the curves in FIGURE 1 for synthetic triglyceride and for the commercially-available cocoa butter shows that both of these products have similar consistencies over the range of temperatures from about 80° F. to about 95° F., that range of temperatures over which cocoa butter has its unique melting characteristics. Both SCI curves rise steeply over the above range of temperatures, indicating a relatively narrow melting range; and in each case a low SCI value is reached at 95° F., indicating almost complete liquidity slightly below body temperature.

In summary, the above synthetic triglyceride has substantially similar weight proportions and distribution of fatty acids and substantially equivalent consistency characteristics to a commercially-available cocoa butter.

EXAMPLE II

Esterification of 1,3-dipalmitin with oleic anhydride

Two grams of 1,3-dipalmitin made as described in Example 2 of Lange and Baur U.S. Patent 2,626,952 and 3 ml. of oleic anhydride made as in Example I herein are reacted in 5 ml. of water-washed, distilled and dried chloroform in the presence of 0.1 ml. 70% perchloric acid catalyst (0.25 mole perchloric acid per mole of anhydride). The reactants are mixed together at room temperature for three hours.

In order to purify the desired product, the resulting reaction mixture is dissolved in 100 ml. ethyl ether together with 20 ml. water. The ether phase is waterwashed three times, dried and evaporated in an inert atmosphere. The residue is crystallized twice from 75 ml. acetone at 20° F. and the crystals dried to provide 2.9 grams of substantially pure product.

The product has an acid value of 0.8 and a hydroxyl value of 2.0. These analytical data show that substantially all the product is triglyceride. The 2-position fatty acids are isolated by the pancreatic enzyme procedure of Example I and the triglyceride is found to contain 92% by weight oleic acid at the 2-position. Thus, substantially all of the above triglyceride is 2-oleodipalmitin; therefore substantially no existing ester group rearrangement occurs during the above esterification reaction.

Similar results are obtainable if molar equivalents of diacid diglycerides are substituted for the 1,3-dipalmitin in this Example. For instance, no existing ester group rearrangement occurs if 1-palmitoyl-3-stearoyl glycerol, 1-gadoleoyl-3-palmitoleoyl glycerol or 1-stearoyl-3-gadoleoyl glycerol is substituted for the 1,3-dipalmitin above.

EXAMPLE III

Esterification of 1,3-diolein with palmitic anhydride

One kilogram of methyl oleate and 150 gms. of glycerol are stirred and heated under vacuum (80–100 mm. Hg) at 220° F. to 338° F. with sodium hydroxide as a catalyst. Reaction is continued for eight hours.

The sample is cooled, fractionated and purified by the previously described methods to yield 156 grams of 96% pure 1,3-diolein.

Four-tenths of a gram of the 1,3-diolein and 0.6 gram palmitic anhydride synthesized in a manner similar to oleic anhydride in Example I but with the substitution of palmitic acid for oleic acid are reacted in 10 ml. of purified chloroform in the presence of 0.025 ml. of 70% perchloric acid catalyst (0.17 mole perchloric acid per mole of anhydride). The reactants are mixed together at room temperature for one hour.

In order to purify the desired product the resulting reaction mixture is dissolved in 100 ml. ethyl ether. The ether phase is water-washed three times, stirred for five minutes with an ion-exchange resin, filtered and evaporated in an inert atmosphere to provide 0.54 gm. of substantially pure product.

The product is shown to be substantially all triglyceride by analysis with thin layer chromatography as described in Privett, Blork and Lundberg, Journal of the American Oil Chemists Society, 1961, vol. 38, page 312. The 2-position fatty acids are isolated by the pancreatic enzyme procedure of Example I and the triglyceride is found to contain 91.9% palmitic, 2.0% stearic and 5.2% oleic acids, by weight, at the 2-position. Thus, most of the triglyceride is 2-palmitodiolein; therefore substantially no existing ester group rearrangement occurs during the above esterification reaction.

EXAMPLE IV

Esterification of 1,2-diolein with palmitic anhydride

Twenty-five gms. of oleoyl chloride, 29 gms. 2-monoolein and 7 ml. pyridine are reacted for three hours in chloroform solution. The sample is purified by conventional methods to yield 28 gms. of 95% pure 1,2-diolein.

Four-tenths of a gram of the 1,2-diolein is substituted for the 1,3-diolein of Example III; otherwise the reaction and purification are exactly the same as in Example III. The reaction yields 0.568 gram of purified product.

Thin layer chromatography shows that substantially all the product is triglyceride. Analysis by the pancreatic enzyme procedure of Example I shows that the triglyceride contains 6.5% palmitic, 0.8% stearic, 92.1% oleic acids, by weight, at the 2-position. Thus most of the triglyceride is 1-palmitodiolein; therefore, substantially no existing ester group rearrangement occurs during the above esterification reaction.

EXAMPLE V

Esterification of 1,3-dicaprin with oleic anhydride

One and one-half grams of 1,3-dicaprin made by the method of Lange and Baur Patent U.S. 2,626,952 and 5.0 ml. oleic anhydride made as in Example I are reacted in the presence of 0.025 ml. of 70% perchloric acid catalyst (0.02 mole perchloric acid per mole of anhydride). No solvent is used other than excess anhydride. The reactants are mixed together at room temperature for one hour. In order to purify the resulting product the reaction mixture is diluted with ether and water-washed as in Example III. The residue is crystallized three times from 50 ml. acetone at −40° F. to provide 1.6 grams of purified product.

Thin layer chromatography shows that substantially all the product is triglyceride. Analysis by the pancreatic enzyme procedure of Example I shows that the triglyceride contains 1.3% capric, 0.6% palmitic and 97.6% oleic acids, by weight, at the 2-position. Thus, substantially all the triglyceride is 2-oleodicaprin; therefore, substantially no existing ester group rearrangement occurs during the above esterification reaction.

EXAMPLE VI

Esterification of 1,3-dipalmitin with rapeseed oil fatty acid anhydride

Rapeseed oil fatty acid anhydride is formed as follows: Rapeseed oil is hydrolyzed to the corresponding rapeseed oil fatty acids. These fatty acids are formed into the corresponding long chain fatty acid anhydrides by the anhydride-forming process disclosed in Example I. The anhydrides so formed are for the most part mixed anhydrides, that is, each anhydride molecule contains two different fatty acid radicals. These anhydrides react in the same manner as if each molecule contains two identical fatty acid radicals.

Two grams of rapeseed oil fatty acid anhydride, 1.5 grams 1,3-dipalmitin prepared as in Example II, 10 ml. purified chloroform and 0.025 ml. 70% perchloric acid are reacted together with mixing at room temperature for one hour (0.08 mole perchloric acid per mole anhydride). The reaction product is diluted with 100 ml. ethyl ether, water-washed and the solvent evaporated in an inert atmosphere. The residue is crystallized three times from 75 ml. acetone at 20° F. to provide 1.72 grams of purified product.

Thin layer chromatography shows that substantially all the product is triglyceride. Analysis of the triglyceride by the pancreatic enzyme procedure of Example I and comparison of the 2-position fatty acid composition of the triglyceride with the original rapeseed oil fatty acids is shown in the following table, wherein all percentages are by weight:

| | Palmitic | Palmitic oleic | Stearic | Oleic | Linoleic | Linolenic | Gadoleic | Erucic |
|---|---|---|---|---|---|---|---|---|
| Original rapeseed fatty acids | 3.0 | 0.3 | 0.3 | 22.9 | 15.8 | 9.0 | 11.5 | 36.0 |
| 2-position fatty acids from synthetic triglyceride | 8.4 | 0.4 | 0.7 | 22.1 | 12.1 | 5.8 | 12.2 | 38.3 |

The above table shows that substantially no existing ester group rearrangement occurs during the above esterification reaction.

EXAMPLE VII

Esterification of 2-monostearin with oleic anhydride-benzene and pyridine as solvents One-half gram of 2-monostearin made by the process described in Martin, Journal of the American Chemical Society, 1953, vol. 75, page 5482, 1.84 grams oleic anhydride made as in Example I, 10 ml. benzene and 0.01 ml. 70% perchloric acid are reacted together with mixing at room temperature for three hours. The reaction mixture contains 0.034 mole perchloric acid per mole of anhydride.

The reaction mixture is diluted with ethyl ether, water-washed and the solvent removed by evaporation. The residue is crystallized twice from 20 ml. acetone at 20° F.

In another case pyridine is substituted for the benzene solvent.

The following table shows yields and analytical data for products resulting from each of the solvents:

| Solvent | Yield grams | Acid Value | Hydroxyl Value | 2-Position Fatty Acid, percent | | |
|---|---|---|---|---|---|---|
| | | | | Palmitic | Stearic | Oleic |
| Benzene | 0.93 | 0.3 | 2.0 | 0.3 | 95.0 | 4.7 |
| Pyridine | 0.652 | 0.1 | 1.0 | Trace | 99.2 | 0.8 |

In each case substantially all the product is 2-stearodiolein; therefore, substantially no existing ester group rearrangement occurs during the above esterification reactions.

EXAMPLE VIII

One and one-half grams 1,3-distearin prepared as in Example 1 of Lange and Baur U.S. Patent 2,626,952 and 1.6 grams oleic anhydride made as in Example I are reacted at room temperature in purified chloroform with 0.025 ml. 20% perchloric acid for 30 minutes. The reaction mixture contains 0.022 mole perchloric acid per mole anhydride.

In order to purify the product the reaction mixture is diluted with ethyl ether, water-washed and the solvent removed by evaporation. The residue is crystallized twice from 50 ml. acetone at 20° F.

In another case, 70% perchloric acid (0.025 ml.) is substituted for the 20% perchloric acid above. The reaction mixture contains 0.1015 mole perchloric acid per mole anhydride.

The following table shows yields and analytical data for products resulting from each of the catalysts:

| Catalyst | Yield grams | Acid Value | Hydroxyl Value | 2-Position Fatty Acid | |
|---|---|---|---|---|---|
| | | | | Stearic | Oleic |
| 20% | 2.05 | 0.8 | 4.8 | 6.0 | 94.0 |
| 70% | 1.92 | 0.3 | 3.0 | 4.0 | 96.0 |

In each case substantially all the product is 2-oleodistearin; therefore, substantially no existing ester group rearrangement occurs during the above esterification.

EXAMPLE IX

Eighteen and four-tenths grams of 1,3-distearin prepared as in Example 1 of Lange and Baur U.S. Patent 2,626,952 and 20 grams oleic anhydride made as in Example I are reacted at room temperature in 100 ml. of purified chloroform in the presence of 0.05 ml. 70% perchloric acid for 10 minutes. The reaction mixture contains 0.016 mole perchloric acid per mole anhydride.

In order to purify the product, the reaction mixture is diluted with ethyl ether, water-washed and the solvent removed in an inert atmosphere. The residue is crystallized twice from 400 ml. acetone at 20° F.

In another case, 0.1 ml. 70% perchloric acid is substituted for the 0.05 ml. above. The reaction mixture contains 0.032 mole perchloric acid per mole anhydride.

The following table shows yields and analytical data for each of the above reactions:

| Moles HClO₄/ mole anhydride | Yield, grams | Acid Value | Hydroxyl Value |
|---|---|---|---|
| 0.016 | 24.5 | 1.0 | 0.5 |
| 0.032 | 25.5 | 0.9 | 0 |

In each case substantially all the product is 2-oleodistearin; therefore, substantially no existing ester group rearrangement occurs during the above esterification reaction.

EXAMPLE X

Carbon tetrachloride, hexane and benzene as solvents

One and one-half grams of 1,3-dipalmitin prepared as in Example 2 of Lange and Baur U.S. Patent 2,626,952 and 2 grams oleic anhydride made as in Example I are reacted at room temperature in 10 ml. carbon tetrachloride in the presence of 0.025 ml. 70% perchloric acid for three hours. The reaction mixture contains 0.08 mole perchloric acid per mole anhydride.

In order to purify the product, the reaction mixture is diluted with ethyl ether and water-washed three times. The solvent is removed by evaporation in an inert atmosphere. The residue is crystallized three times from acetone at 20° F.

In another case, hexane is substituted for the carbon tetrachloride solvent. In still another case, benzene is substituted for the carbon tetrachloride solvent.

The following table shows yields and analytical data for products resulting from each of the three solvents:

| Solvent | Yield, grams | Acid Value | Hydroxyl Value | 2-Position Fatty Acid | | |
|---|---|---|---|---|---|---|
| | | | | Palmitic | Oleic | Stearic |
| Carbon tetrachloride | 2.01 | 0.2 | 0 | 2.4 | 96.9 | 0.8 |
| Hexane | 1.40 | 0.1 | 5.3 | | | |
| Benzene | 2.03 | 0.2 | 0 | 2.1 | 97.3 | 0.6 |

In each case, substantially all the product is 2-oleodipalmitin; therefore, substantially no existing ester group rearrangement occurs during the above esterification reaction.

EXAMPLE XI

Esterification of 1-monostearin with stearoyl propylene glycol succinate anhydride Forty-four gms. (0.1 mole) of stearoyl propylene glycol hydrogen succinate are mixed with 30 gms. (0.3 mole) of acetic anhydride and heated at reflux for one hour. The mixture is then heated at 250° F. to 265° F. for two hours under a pressure of 2–5 mm. Hg. The residue is cooled with recovery of 41.5 gms. (96% yield) of stearoyl propylene glycol succinate anhydride (an anhydride having the previously described structural formula wherein X is a residue of a monoacyl diol half-ester of a dicarboxylic acid).

Three and six-tenths gms. of 1-monostearin (0.01 mole) prepared by the process described in Mattson and Volpenhein, Journal of Lipid Research, July 1962, vol. 3, No. 3, pp. 283, 284, is dissolved in 144 ml. benzene with slight warming. Nineteen gms. (0.022 mole) of the above prepared stearoyl propylene glycol succinate anhydride is added with stirring. The sample is treated with 0.1 ml. 70% perchloric acid catalyst and stirring continued at room temperature for one hour. The reaction mixture contains 0.08 mole perchloric acid per mole of anhydride.

In order to purify the desired product, the reaction mixture is diluted with 100 ml. water and the mixture shaken in a separatory funnel. The washed benzene solution is dried and the product isolated by chromotography on a 300 gm. silica gel (+5% water) column. Elution with one liter of benzene and with one liter of benzene containing 2% ethyl ether and 1% acetic acid yields 11.1 grams product. Fractional crystallization of a 6.7 gram portion of the product from 15 volumes of acetone at 70° F., 50° F. and 0° F. provides 0.3 gram, 4.7 grams and 1 gram, respectively.

The 4.7 gram fraction is at least 90% 1-stearoyl-2,3- di(stearoyl propylene glycol succinatyl) glycerol having the structural formula

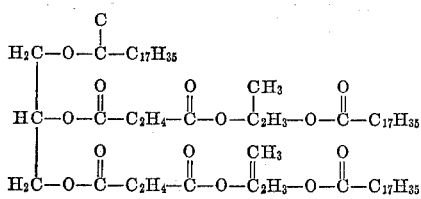

Substantially no existing ester group rearrangement occurs during the above esterification reaction.

EXAMPLE XII

Esterification of 1,3-distearin with octadecyl glutarate anhydride

Octadecyl glutarate anhydride (an anhydride having the previously described structural formula wherein X is a residue of an alkyl half-ester of a dicarboxylic acid) is prepared the same as the anhydride in Example XI but with substitution of a molar equivalent of octadecyl hydrogen glutarate for the stearoyl propylene glycol hydrogen succinate.

Six and two-tenths grams distearin prepared as in Example 1 of Lange and Baur U.S. Patent 2,626,952 is dissolved in 120 ml. benzene with stirring and slight warming. Seven and nine-tenths grams of the above octadecyl glutarate anhydride is added; and when the reagents are completely dissolved 0.1 ml. of 70% perchloric acid is added. The sample is then stirred at room temperature for one hour. The reaction mixture contains 0.11 mole perchloric acid per mole anhydride.

In order to purify the desired product, the reaction mixture is diluted with 100 ml. water and the aqueous layer separated and discarded. The benzene layer is washed twice more with water, dried with five grams sodium sulfate, filtered and evaporated to dryness. The residue is crystallized from 200 ml. acetone at 195° F. The crystals are recrystallized from 150 ml. acetone at 212° F. to provide 7.8 grams of 95% pure 1,3-distearoyl-2-octadecyl glutaratyl glycerol. Substantially no existing ester group rearrangement occurs during the above esterification reaction.

EXAMPLE XIII

Esterification of 1,3-distearin with 1,3-distearin-2-succinate anhydride 1,3-distearin-2-succinate anhydride (an anhydride having the previously described structural formula wherein X is a residue of a diacyl glyceride half-ester of a dicarboxylic acid) is prepared the same as the anhydride in Example XI but with substitution of a molar equivalent of 1,3-distearin-2-hydrogen succinate for the stearoyl propylene glycol hydrogen succinate.

Six and two-tenths grams 1,3-distearin prepared as in Example 1 of Lange and Baur U.S. Patent 2,626,952 is dissolved in 250 ml. benzene with stirring and slight warming. Fifteen grams of the above 1,3-distearin-2-succinate anhydride is added and dissolved with stirring. When the reagents are completely dissolved 0.2 ml. 70% perchloric acid is added and the reaction mixture stirred at room temperature for one hour. The reaction mixture contains 0.22 mole perchloric acid per mole anhydride.

In order to purify the product, 100 ml. water are added and the aqueous phase separated and discarded. The product is further purified by treatment with three 30-gram portions of base-form ion exchange resin. The benzene solution is evaporated and the residue crystallized from 200 ml. acetone at 90° F. to provide 10.2 grams of di(1,3-distearin)succinate. Substantially no existing ester group rearrangement occurs during the above esterification reaction.

EXAMPLE XIV

Esterification of propylene glycol monooleate with stearoyl-4-hydroxybutyric anhydride One mole 1,2-propylene glycol is reacted with 0.5 mole oleic acid in one liter of xylene in the presence of 0.01 mole of p-toluene sulfonic acid catalyst. The sample is refluxed under a moisture trap for two hours, poured into ice water, water-washed and solvent-evaporated to provide 70% pure propylene glycol monooleate. The impure product is purified with a silica gel column to provide about 0.35 mole substantially pure propylene glycol monooleate. The propylene glycol monooleate is present as a mixture of isomeric esters with 80% of the oleoyl groups at the primary hydroxyl position and 20% at the secondary position of 1,2-propylene glycol.

Stearoyl-4-hydroxybutyric anhydride (an anhydride having the previously described structural formula wherein X is a residue of a monoacyl derivative of a primary monohydroxy monocarboxylic acid) is prepared the same as the anhydride in Example XI but with substitution of a molar equivalent of stearoyl-4-hydroxybutyric acid for the stearoyl propylene glycol hydrogen succinate.

Three and four-tenths grams of the above propylene glycol monooleate is dissolved in 100 ml. benzene. Ten grams of the above stearoyl-4-hydroxybutyric anhydride is added to the solution and stirred with slight warming until solution is complete. When the reagents are completely dissolved, 0.1 ml. 70% perchloric acid is added and stirring continued at room temperature for one hour. The reaction mixture contains 0.08 mole perchloric acid per mole anhydride.

In order to purify the desired product, the reaction mixture is diluted with 100 ml. water and the aqueous phase separated and discarded. The benzene layer is evaporated to dryness and the residue is dissolved in 100 ml. hexane. The hexane solution is crystallized at 50° F. with a yield of 4.5 grams of material, primarily stearoyl-4-hydroxybutyric acid. The filtrate from the 50° F. crystallization is evaporated to dryness and this residue is dissolved in 200 ml. acetone. The acetone solution on crystallization at 40° F. provides 6 grams of oleoyl (stearoyl-4-hydroxybutyryl) propylene glycol. The product consists of a mixture of isomeric esters with 80% by weight of the oleoyl groups at the primary hydroxyl position and 20% at the secondary hydroxyl position of 1,2-propylene glycol. This mixture of isomers results from the fact that the propylene glycol monooleate used consists of an 80–20 mixture of primary and secondary esters respectively. Thus, substantially no existing ester group rearrangement occurs during the above esterification reaction.

EXAMPLE XV

Esterification of 1-propylene glycol monobehenate with oleic anhydride 1-propylene glycol monobehenate is made as follows: Ethyl lactate 450 grams (3.8 moles) is mixed with 1.2 ml. concentrated hydrochloric acid and the mixture cooled in an ice bath. Dihydropyran 420 grams (4.9 moles) is added with stirring, after which the sample is allowed to warm to room temperature. After three hours, 10 grams of potassium carbonate is added and the sample stirred. The product is distilled under reduced pressure with collection of 366 grams tetrahydropyranyl ethyl lactate boiling at 65° to 70° C. at 1–2 mm. pressure. Tetrahydropyranyl ethyl lactate 82 grams (0.46 mole) is dissolved in 300 ml. tetrahydrofuran and the solution is cooled in an acetone-ethanol Dry Ice bath. The THP ethyl lactate solution is added slowly to lithium aluminum hydride solution and subsequently the mixture is warmed to room temperature. The reactants are diluted with 150 ml. ethanol followed by two liters of water. The sample is then extracted three times with 400 ml. portions of benzene. The benzene extracts are dried with sodium sulfate, filtered, and the filtrate is distilled with collection of the fraction boiling at 78–81° C. at 3 mm. pressure. The yield is 28 grams of 2-tetrahydropyranyl propylene glycol. 2-tetrahydropyranyl propylene glycol 16.0 grams (0.1 mole) is interesterified with 39 grams methyl behenate using 4 ml. of 40% trimethyl benzyl ammonium methoxide as a catalyst. The reactants are stirred in a 250 ml. flask heated at 60–80° C. under a reduced pressure of 200 mm. Hg for 6 hours. The reactants are poured into 600 ml. of hexane and the hexane solution washed with 400 ml. of 1% potassium bicarbonate solution. The washed hexane layer is diluted with 200 ml. ethanol and 75 grams urea is added to the sample. Adduct formation with urea is accomplished by stirring the sample initially at 40° C. and allowing the mixture to cool at 25° C. during a two-hour interval. The urea adduct is removed by filtration and discarded. The adduction with urea is repeated using 60 grams urea. The filtrate from the second urea adduction is water-washed three times and the hexane layer is evaporated to dryness. The residue is dissolved in 300 ml. hexane and the solution is crystallized at −18° C. Filtration at −18° C. yields 21.3 grams of 1-behenoyl-2-tetrahydropyranyl propylene glycol. 1-behenoyl-2-tetrahydropyranyl propylene glycol 8 grams (0.0165 mole) is cleaved by reaction with 11 ml. of 1.6 molar boric acid in trimethyl borate. The reactants are heated in a boiling water bath with application of vacuum. Heating is continued for 15 minutes with a vacuum of 2–5 mm. Hg pressure during the final 10 minutes. The residue is cooled to room temperature and dissolved in 200 ml. ethyl ether and water-washed three times. The ether phase is dried with sodium sulfate, and evaporated to dryness on an evaporator without warming above 30° C. The residue is dissolved in 100 ml. petroleum ether and crystallized at 70° F. The crystals recovered at 70° F. are recrystallized from 200 ml. petroleum ether at 50° F. to yield 4.6 grams of 1-propylene glycol monobehenate.

Five gms. of the above prepared 1-propylene glycol monobehenate is dissolved in 100 ml. benzene together with 6 grams oleic anhydride made as in Example I. The sample is stirred at room temperature until solution is complete. One-tenth ml. 70% perchloric acid is added and the sample stirred for 30 minutes at room temperature. The reaction mixture contains 0.09 mole of perchloric acid per mole anhydride.

In order to purify the product 100 ml. water are added and the aqueous phase separated and discarded. The benzene solution is evaporated to dryness and the residue dissolved in 100 ml. acetone. The acetone solution is crystallized at 0° F. with recovery of 6.5 grams of greater than 95% pure 1-behenoyl-2-oleoyl propylene glycol. Substantially no existing ester group rearrangement occurs during the above esterification reaction.

EXAMPLE XVI

Esterification of 1,4-distearoyl erythritol with oleic anhydride

One mole erythritol is reacted with two moles methyl stearate in one liter of dimethylacetamide in the presence of 0.1 mole sodium methoxide catalyst. The reaction mixture is heated at 100–120° C. under reduced pressure (80–100 mm. Hg) for three hours with slow distillation of solvent such that about 400 ml. of solvent is removed in the three-hour period. Twenty cubic centimeters of 50% by volume aqueous acetic acid is added to the sample and this mixture poured into two liters of water. One liter of an ethyl acetate-butanol mixture (four parts by volume ethyl acetate to one part by volume butanol) is added. The ethyl acetate-butanol layer is separated, water-washed twice and treated with 500 gms. urea. This mixture is stirred at room temperature for two hours. The mixture is then filtered and 0.12 mole of 1,4-distearoyl erythritol is recovered from the urea adduct by dissolving in acetone and crystallizing at 90° F.

Six and one-half grams of the above 1,4-distearoyl erythritol is dissolved in 200 ml. ethyl acetate with slight warming while stirring. Six and six-tenths grams oleic anhydride prepared as in Example I is added, followed by 0.1 ml. 70% perchloric acid. The reaction mixture is stirred at room temperature for one hour. The reaction mixture contains 0.08 mole perchloric acid per mole anhydride.

In order to purify the product, the reaction mixture is washed three times with water and the ethyl acetate solution dried with 15 grams of sodium sulfate and filtered. The solution after crystallizing 24 hours yields 7.3 grams of substantially pure 1,4-distearoyl-2,3-dioleoyl erythritol. Substantially no existing ester group rearrangement occurs during the above esterification reaction.

The foregoing description has been presented describing certain operable and preferred embodiments of this invention. Other variations will be apparent to those skilled in the art.

What is claimed is:

1. A process for synthesizing specific complete mixed polyol esters from partial polyol esters in such manner that substantially no ester group rearrangement occurs, said process comprising reacting a polyol which has been partially esterified with a monocarboxylic acid containing about 8 to 22 carbon atoms, said polyol being selected from the group consisting of aliphatic diols wherein the hydroxyl groups are unsymmetrically substituted with respect to the carbon chain and aliphatic polyols containing at least three hydroxyl groups, with a molar excess of an acidic lipid anhydride having the structural formula

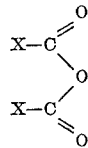

wherein X is a radical selected from the group consisting of:

(1) alkyl groups containing from 7 to 21 carbon atoms and having the formula R—;

(2) residues of alkyl half-esters of a dicarboxylic acid having the formula

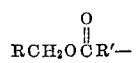

(3) residues of monoacyl diol half-esters of a dicarboxylic acid having the formula

(4) residues of diacyl glyceride half-esters of a dicarboxylic acid having the formula

and (5) residues of monoacyl derivatives of a primary monohydroxy monocarboxylic acid having the formula

wherein in (1)–(5) above:

R is an alkyl group containing 7 to 21 carbon atoms;
R′ is an alkylene group containing 2 to 4 carbon atoms;
R″ is an alkylene group containing 0 to 4 carbon atoms;
R‴ is an alkylene group containing 2 to 5 carbon atoms; and
Z is a radical selected from the group of hydrogen and methyl;

said reaction being carried out in the presence of a perchloric acid catalyst, the molar ratio of said catalyst to said anhydride exceeding about 0.01 to 1.

2. The process of claim 1 wherein the partially esterified polyol is a partial glyceride ester.

3. The process of claim 1 wherein the partially esterified polyol is a partial ester of 1,2-propylene glycol.

4. The process of claim 1 wherein both X's in the acidic lipid anhydride structural formula are identical.

5. The process of claim 4 wherein X in the acidic lipid anhydride structural formula is an alkyl group containing 7 to 21 carbon atoms.

6. The process of claim 4 wherein the acidic lipid anhydride is oleic anhydride.

7. The process of claim 4 wherein the acidic lipid anhydride is palmitic anhydride.

8. The process of claim 1 wherein the perchloric acid catalyst is present as an aqueous solution containing from about 20% to about 70%, by weight, of perchloric acid.

9. The process of claim 1 wherein the partial polyol ester is a monoglyceride and the reaction is carried out in an organic solvent selected from the group consisting of benzene and pyridine.

10. A process for preparing synthetic cocoa butter, which process comprises acylating the 2-hydroxyl group of 1-palmitoyl-3-stearoyl glycerol with a molar excess of oleic anhydride in the presence of perchloric acid catalyst, and separating and crystallizing the synthetic cocoa butter thus formed.

11. A process for preparing synthetic cocoa butter, which process comprises reacting substantially completely hydrogenated palm oil with glycerol in the presence of triacetin and sodium methoxide catalyst, separating and crystallizing the 1-palmitoyl-3-stearoyl glycerol formed, acylating the 2-hydroxyl groups thereof with a molar excess of oleic anhydride in the presence of perchloric acid catalyst, and separating and crystallizing the synthetic cocoa butter thus formed.

References Cited

UNITED STATES PATENTS 3,012,890  12/1960  Dutton et al.

OTHER REFERENCES

Groggins: Unit Processes in Organic Synthesis, 1947, pp. 624–7, 639–41.

NICHOLAS S. RIZZO, *Primary Examiner.*

R. J. GALLAGHER, *Assistant Examiner.*